United States Patent
Wadström

(10) Patent No.: US 8,142,652 B2
(45) Date of Patent: Mar. 27, 2012

(54) CONTAINER FOR PURIFICATION OF WATER BY SUNLIGHT

(76) Inventor: Petra Wadström, Åkersberga (SE)

( * ) Notice: Subject to any disclaimer, the term of this patent is extended or adjusted under 35 U.S.C. 154(b) by 0 days.

(21) Appl. No.: 12/745,161

(22) PCT Filed: Dec. 5, 2008

(86) PCT No.: PCT/SE2008/000685
§ 371 (c)(1),
(2), (4) Date: Aug. 27, 2010

(87) PCT Pub. No.: WO2009/072954
PCT Pub. Date: Jun. 11, 2009

(65) Prior Publication Data
US 2010/0314306 A1 Dec. 16, 2010

(30) Foreign Application Priority Data
Dec. 7, 2007 (SE) .................................... 0702730

(51) Int. Cl.
*C02F 1/30* (2006.01)
(52) U.S. Cl. ........ 210/175; 210/464; 210/473; 210/475; 220/661; 220/662; 220/665
(58) Field of Classification Search .................. None
See application file for complete search history.

(56) References Cited

U.S. PATENT DOCUMENTS

| 4,239,032 A | 12/1980 | Irving |
| 4,557,251 A | 12/1985 | Burkhardt |
| 2007/0262010 A1* | 11/2007 | Wadstrom ............ 210/175 |
| 2010/0314306 A1* | 12/2010 | Wadstrom ............ 210/175 |

FOREIGN PATENT DOCUMENTS

| RU | 2 032 863 C1 | 4/1995 |
| WO | WO 2006/059948 A1 * | 6/2006 |

* cited by examiner

*Primary Examiner* — Robert James Popovics
(74) *Attorney, Agent, or Firm* — Dickstein Shapiro LLP

(57) ABSTRACT

A container for purification of water by a combination of filtering, heating, and UV-radiation of the water is disclosed. The container includes a first section, which at least partly includes a sunlight permeable layer, and a second section, which at least partly is opposite the first section and at least partly includes a sunlight absorbing and infrared radiation emitting (IR-emitting) layer. The first and the second section together enclose a volume, in which the water can be received to be heated by and exposed to sunlight. According to the present invention, the first section is arranged such that the permeable layer is essentially flat, and the second section is arranged such that the volume includes at least a first and a second portion, wherein the first and the second portion, respectively, have a first and a second distance, respectively, between the permeable layer and the sunlight absorbing and IR-emitting layer, where the first and second distances are mutually different. A temperature difference between the water in the first and second portion is created after a period of sun exposure.

12 Claims, 4 Drawing Sheets

CONTAINER FOR PURIFICATION OF WATER BY SUNLIGHT

FIELD OF THE INVENTION

The present invention relates to a container for purification of water by utilizing sunlight, as defined in the preamble of claim 1, wherein the container includes a first section, which at least partly includes a sunlight permeable layer, and a second section, which at least partly is opposite the first section and at least partly includes a sunlight absorbing and infrared radiation emitting (IR-emitting) layer, wherein the first and the second section together enclose a volume, in which the water can be received to be heated by and exposed to sunlight.

RELATED ART AND BACKGROUND OF THE INVENTION

Purification of water on a household level is a necessity in order to avoid diseases in large parts of the world. In particular, in the poor part of the world, there is a large demand for a simple way to purify water on a household level, which is to be used as drinking water or the like. During crisis situations, which can occur anywhere on the earth, such as natural disasters, wars, and epidemic diseases, water purification may be extremely important in order to limit spreading of diseases, for example diarrhea diseases.

The impure water can include a number of harmful impurities, such as microorganisms in the form of pathogens. Traditionally, the water is purified from these impurities by boiling it. In poor countries, boiling of water is done over an open fire, whereby a considerable amount of wood is consumed. Approximately 1 kg wood is needed for 1 liter of water to reach 100° C. To fetch wood takes a long time and can be costly, at the same time as it has a negative effect on the environment. Here, the environment is harmed by deforestation, which results in soil erosion.

Thus, the traditional purification method has a number of disadvantages regarding environmental effects, usage possibilities and the work effort.

Other methods for purification of drinking water could be pasteurization and filtering. Pasteurization is performed by heating the water to a high temperature during a long time, which is costly. The filtering is only able to filter out microorganisms being bound to relatively large particles.

By the Swedish patent SE527988, it is already known a container for purifying water. The container includes a surface having a layer, which permeable for sunlight, and a surface, which absorbs the sunlight, where the absorbing surface has a dark color. Here, the solar radiation passes through the surface being permeable for sunlight, further through the impure water, and to the absorbing surface. The absorbing surface absorbs ultraviolet (UV) radiation and emits infrared (IR) radiation for achieving a temperature increase of the water in the container. By the use of the container, a water temperature of over 60° C. can, under favorable conditions, be obtained, after the container having been lying in sunlight for three hours. Here, a combination of filtering, heating, and UV-radiation of the water is used for reducing the number of as well as killing unwanted microorganisms, and thereby purifying the water.

However, there is a need for improving the purification of the already known container, and to make it more effective, there is especially a need for making the purification process faster and making it possible to purify a larger volume of water during a shorter time period.

AIM AND MOST IMPORTANT FEATURES OF THE INVENTION

It is an object of the present invention to provide a container for purification of water that solves the above stated problems of traditional water purification.

The present invention aims to provide a container for purification of water, which is inexpensive to produce, easy to handle, and purifies water with a good quality within a short amount of time.

The object is achieved by the container according to the characterizing portion of claim 1, wherein the first section is arranged such that the permeable layer is essentially flat, and the second section is arranged such that the volume includes at least a first and a second portion, wherein the first and the second portion, respectively, have a first and a second distance, respectively, between the permeable layer and the sunlight absorbing and IR-emitting layer, where the first and second distances are mutually different, wherein a temperature difference between the water in the first and second portion is created after a period of sun exposure.

The forming of the first and second portion of the volume such that they have a mutually different distance between the permeable layer and the absorbing layer has the effect that the water in the volume portion having the shortest distance will be heated up quicker than the water in the volume portion having the longer distance. This creates temperature differences for the different volume portions. Due to the strive of the water for temperature equalization, streams will be created in the water volume when the volume portions are blended. This circulation of the water has the effect that the heating is quicker and also that the killing of microorganisms is more efficient, since they are radiated by UV-radiation from various directions.

Forming of the first section as including an essentially flat permeable layer has the advantage that a minimum of sunlight is reflected away from the container, that is, as much sunlight as possible is allowed to penetrate the container. Since the permeable layer is essentially flat, no reflecting air pockets are created between the water in the container and the permeable layer. To maximize the amount of sunlight being let in to the container has a positive effect on both the heating and the killing.

Thus, the present invention has the advantage that the purification of the water is quicker and provides a better water purification.

According to an embodiment of the present invention, the volume portions are achieved by different distances between the permeable layer and the absorbing layer by forming the absorbing layer such that it includes at least two surface portions in mutually different height levels in relation to a propagation plane for the layer.

According to an embodiment of the present invention, additional temperature differences, and thereby streams, are created by arranging at least one part of the absorbing layer in a light color, preferably white.

The present invention has the advantages that the streams, being created by the temperature differences, has the effect that the heating is quicker, and that the killing of microorganisms in the water by the use of UV-radiation is more efficient than for prior art containers for water purification.

DETAILED DESCRIPTION OF PREFERRED EMBODIMENTS

Figure 1A:
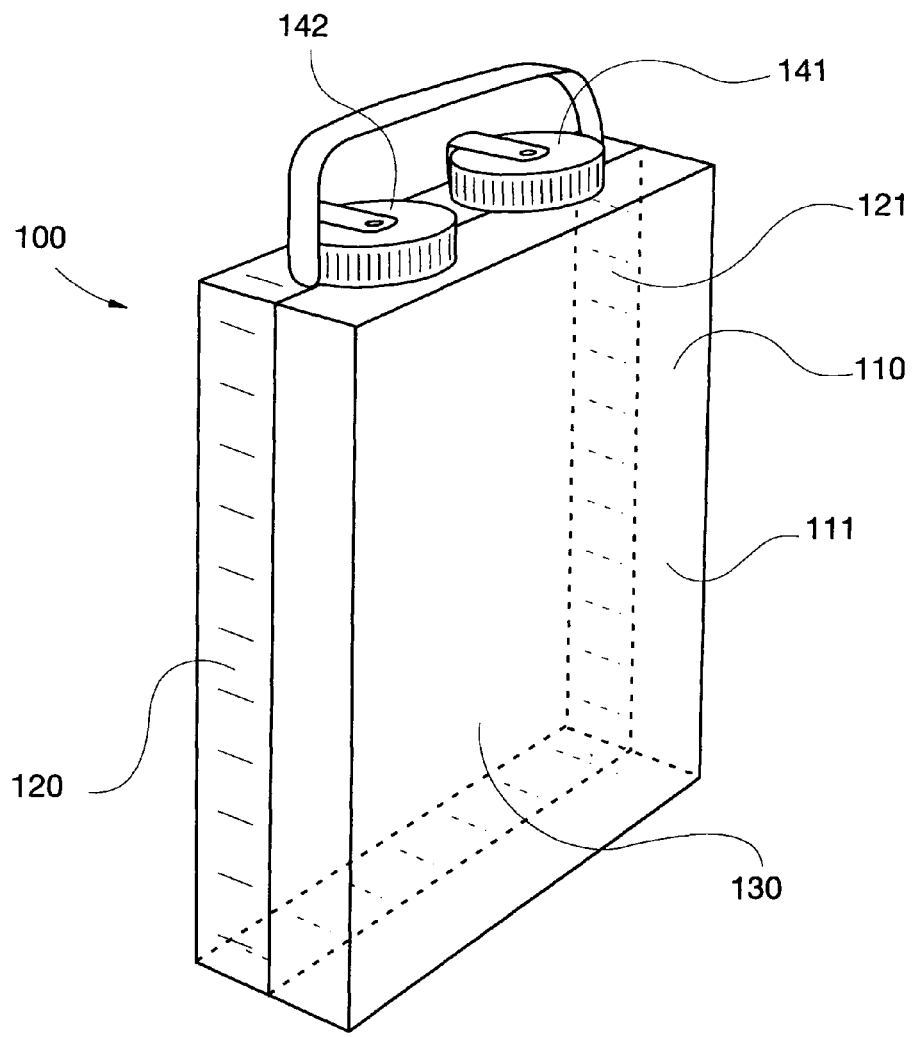
FIGS. 1a-b show a container according to prior art.
Figure 1B:
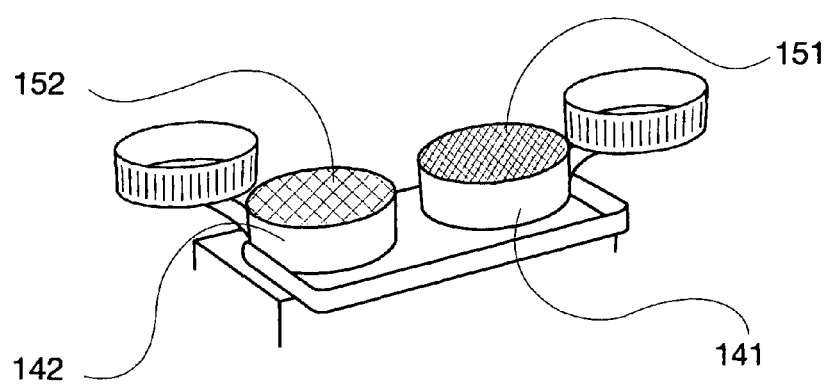

FIGS. 1a and 1b show the container known from SE527988. Container 100 includes a first section 110, which includes a layer 111 being permeable for the UV-radiation of the sunlight. The permeable layer 111 is thus transparent for UV-radiation. (Hereafter, permeable and transparent are used synonymously in the text.) The container also includes a second section 120, which includes a UV-absorbing and IR-emitting (hereafter denoted UV-absorbing) layer 121.

The UV-transparent layer 111 and the UV-absorbing and IR-emitting layer 121 are essentially opposite sides in the container, and the first section 110 and the second section 120 together enclose a volume 130, which also constitute the volume of the container. Further, the container includes a first and a second sealable opening 141, 142, each provided with a filter 151, 152. One of the filters, for example filter 151, is used for filtering the water when the container is filled with water. This filter 151 should therefore be relatively fine-meshed, such that organic material and larger microorganisms get caught in the filter. The water passes through the second filter 152 when the container is emptied of water. This filter 152 can therefore be made relatively coarse-meshed, since its primary purpose is that larger organic materials, or body parts, such as for example fingers, are not to be in contact with the interior of the container.

When used, the container is filled with impure water in the first opening 141, through the filter 151, until the volume 130 is filled up. When the water passes through the filter 151, organic materials and some microorganisms are filtrated out of the water. The container 100 is then placed with the UV-transparent layer 111 in the direction of the sun, such that the solar rays get through the transparent layer 111, radiate the water in the volume 130 and finally shine on the UV-absorbing layer 121. The UV-absorbing layer absorbs UV-radiation when it is radiated by the sunlight, and emits IR to the water in the volume 130 in order to increase the temperature of the water.

The water is purified by having its temperature increased to a temperature of about 60° C. at the same time as the UV-radiation from the sunlight kills the microorganisms in the water. Discharge of the pure water is performed through the second opening 142 and its filter 152. For this container, it takes about three hours to reach the temperature 60° C. for a volume of 2 liters of water.

Figures 2A, 2B:
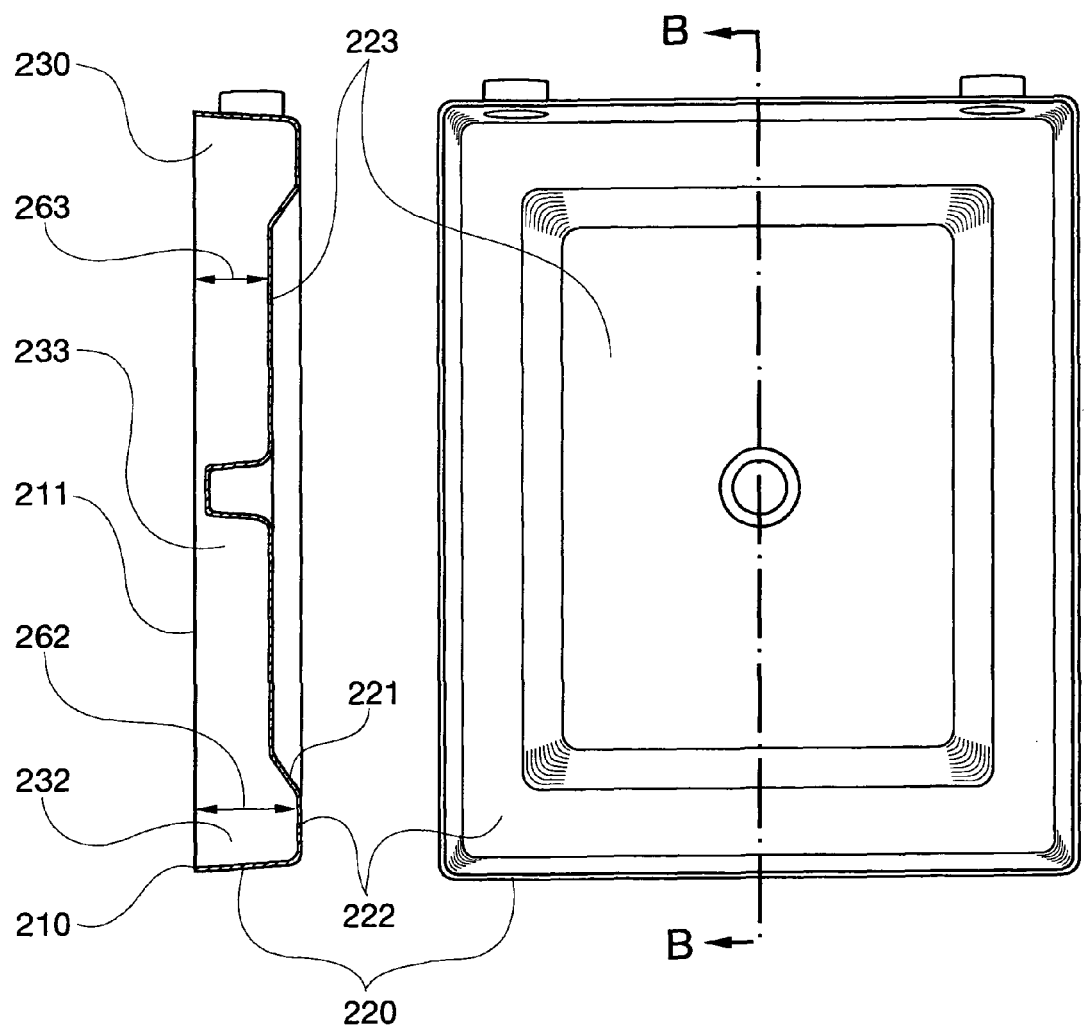
FIGS. 2a-b show a preferred embodiment of the present invention.

FIGS. 2a and 2b show an embodiment of the present invention. In these figures, a first section 210 of the container is shown, which includes the UV-transparent layer 211. Further, a second section 220 of the container is shown, which includes the UV-absorbing layer 221. The first and second section 210, 220 are arranged at least partly opposite each other. The UV-transparent layer 211 is, according to this embodiment, essentially flat, while the UV-absorbing layer 221 is arranged such that it includes two different surface portions 222, 223, which are arranged at different levels in relation to a plane of propagation of the UV-absorbing layer 221. As is shown in FIGS. 2a and 2b, the UV-absorbing layer can extend along the walls of the second section, up to and reaching the second, that is up to the UV-transparent layer. Thereby, The UV-absorbing layer is given a large part of the total area within the container. The second section also includes a support body, which is arranged to support the UV-transparent layer 211. In FIGS. 2a-b, the support body, is arranged centered in the container and is covered with a UV-absorbing layer. However, the support body can also be arranged in other positions in the container, and does not have to be covered by a UV-absorbing layer.

To obtain a quick heating, the surface of the UV-absorbing layer should preferably be formed such that it takes up a large part of the container, since the size of the UV-absorbing layer has a big impact on the heating of the water. For example, the UV-absorbing layer can take up over half of the total surface of the container, and preferably over two thirds of the total surface of the container. The UV-absorbing layer usually has a matt black surface.

The different levels for the different surface portions 222, 223 cause the different surface portions to have mutually different distances 262, 263 to the UV-permeable layer 211. The mutually different distances 262, 263 have the effect that two volume portions 232, 233 of the total volume 230 being enclosed by the first and the second section 210, 220, have mutually different depths, which correspond to the mutually different distances 262, 263. As can be seen in the FIGS. 2a-b, according to this embodiment, the surface portion 223, having the shorter distance 263 to the UV-transparent layer 211, preferably has the form of a centered plateau, which is surrounded by a valley being made up of the surface portion 222 having the longer distance 262 to the UV-transparent layer 211.

To arrange the UV-absorbing layer such that it includes the two surface portions on different levels, and the essentially flat form of the permeable layer have an effect on the function of the container, such that the water in the volume portion 233 above the surface portion 223, where the UV-absorbing layer 221 has a shorter distance to the UV-absorbing layer 211, will be heated quicker than in the volume portion 232 above the surface portion 222, where the UV-absorbing layer 221 has a longer distance to the UV-absorbing layer 211. Thus, there will be temperature differences present for the different volume portions 232, 233 after a period of sun exposure. Tests for a water volume of about 2 liters have shown that a temperature difference of 2° C. between the two volume portions 232, 233 can be accomplished by a suitable design of the surface portions 222, 223 and of the levels they are at in relation to the plane of propagation for the UV-absorbing layer.

As the water strives for a temperature equalisation for the whole of the volume 230, the water in the two volume portions 232, 233 will be mixed with each other. This blending of the water of the volume portions creates a circulation of the water, which speeds up the heating of the water. Tests have shown that heating of about 2 liters of water to a temperature of about 60° C. is between approximately 30 minutes and 45 minutes quicker by the use of this embodiment of the invention, as compared to a flat UV-absorbing surface.

Also, the circulation of the water makes the microorganisms circulate with the water, which has the further effect that the sun shines on the microorganisms from various directions when they whirl around in the water due to the circulation. This UV-radiation from various directions is considered to have a favourable effect on the killing of the microorganisms.

This embodiment of the invention has thus the advantage that a quicker and better purification of the water is made possible, by way of a faster heating of the water and that the microorganisms are radiated by UV-radiation from a number of directions when they whirl around in the water due to the circulation.

The design of the permeable layer as being essentially flat makes both the heating and killing processes more efficient, as the amount of sunlight being let in to the container is maximised, since the reflection of sunlight is minimised. The design of the UV-absorbing layer as including only two surface portions has the effect that the surface portions have relatively large areas, which increases the efficiency of the heating, and increases the stream of the water in the container. Thus, the design of the UV-absorbing layer contributes to a more efficient killing.

Suitable measures of the container for a volume of 5 liters can, for example, be 40.0 cm high, 34.5 cm wide, and 5 cm deep. The difference between the mutually different distances 262, 263 is, according to an embodiment of the invention, between approximately 5 and 30 mm, preferably between approximately 10 and 20 mm. According to an embodiment of the invention, this difference is approximately 15 mm. For this embodiment, the distance 262 is approximately 5 cm, and the distance 263 is approximately 3.5 cm. Naturally, both the volume and the other above mentioned measures can be varied within the scope of the invention, which is realised by a skilled person.

FIGS. 3a-e show different forms of the UV-absorbing layer, which are used in different embodiments of the present invention.

Figure 3A:
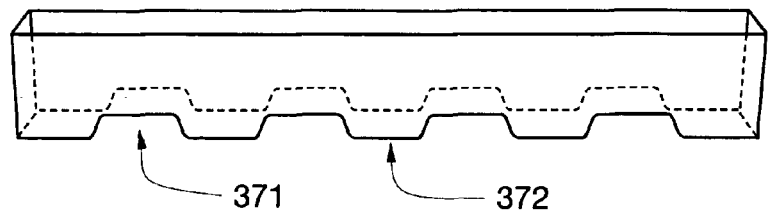
FIGS. 3a-e show different preferred embodiments of the present invention.

According to the embodiment illustrated in FIG. 3a, the surface portions of the UV-absorbing layer are made up of ridges 371 and valleys 372 arranged in a cross-direction of the container. The number of ridges and valleys can here be varied by a skilled person, such that a required temperature difference, and thereby also circulation, is achieved for the volume portions of water above the ridges and valleys, respectively. In FIG. 3a, essentially rectilinear ridges 371 and valleys 372, which have essentially rectilinear boarders between the surface portions are shown. The ridges 371 and valleys 372 can also be shaped as essentially wave formed, which then have essentially wave formed borders between the surface portions.

Figure 3B:
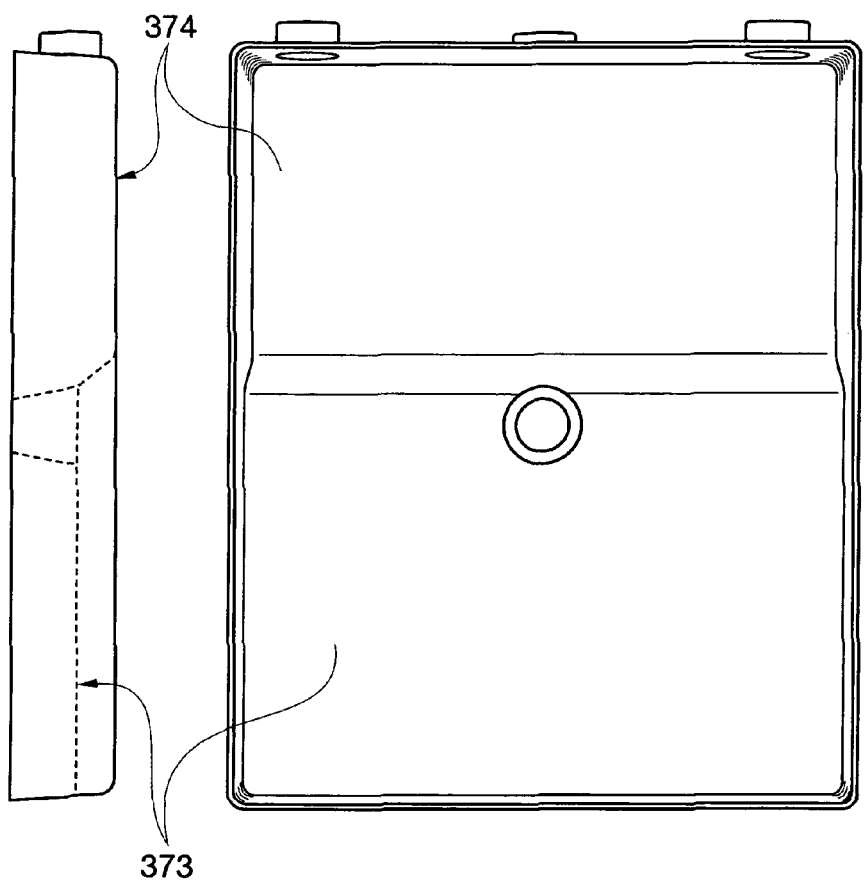

According to the embodiment illustrated in FIG. 3b, the surface portions of the UV-absorbing layer are made up of a plateau 373 and a valley 374 arranged alongside of each other in the cross-direction of the container, where the plateau 373 and the valley 374 each form essentially half of the surface. The sizes of the plateau 373 and the valley 374 can here be varied by a skilled person such that required temperature difference, and thereby also circulation, is achieved for the volume portions of water above the plateau 373 and the valley 374. Forming the UV-absorbing layer as including only two surface portions, the plateau 373 and the valley 374, results in relatively large areas for the surface portions, which results in an efficient killing.

Figure 3C:
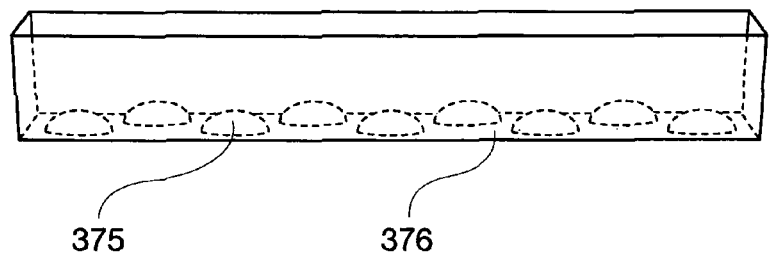

According to the embodiment illustrated in FIG. 3c, the surface portions of the UV-absorbing layer are made up of one or more hills 375, and one or more between them situated valleys 376. The hills have a form essentially resembling half of a sphere. The number of hills 375, the location of the hills, and the form itself of the hills can here be varied by a skilled person, such that a required temperature difference, and thereby circulation, is achieved for the volume portions of water above the hills 375 and the valley 376.

Figure 3D:
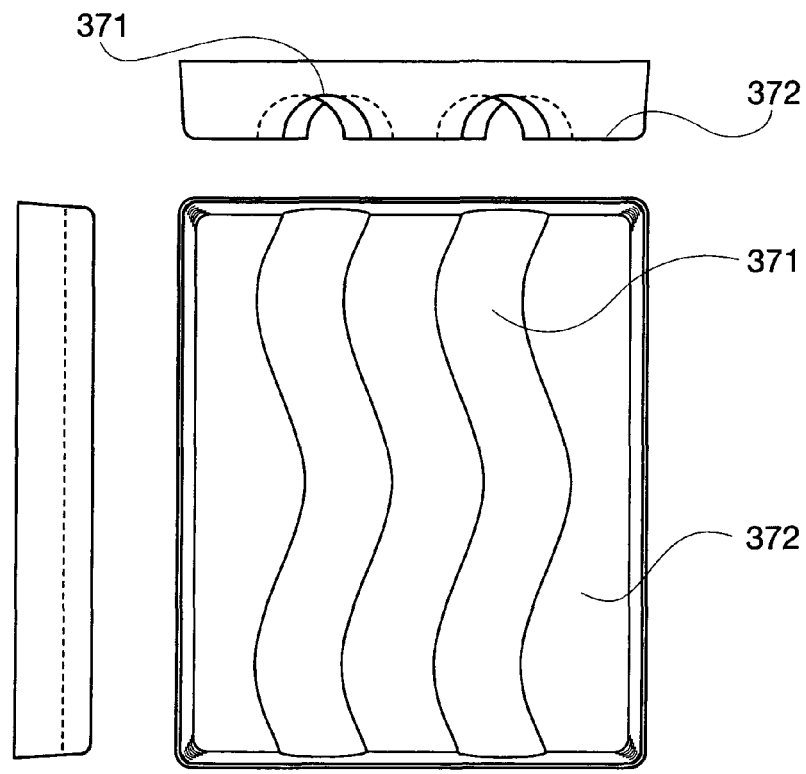

According to the embodiment illustrated ion FIG. 3d, the surface portions of the UV-absorbing layer are made up of ridges 371 and valleys 372 being arranged in the lengthwise direction of the container. The number of ridges and valleys can here be varied by a skilled person such that required temperature difference, and thereby also circulation, is achieved for the volume portions of water above the ridges and valleys, respectively. In FIG. 3d, essentially wave formed ridges 371 and valleys 372 are shown, which have essentially wave formed borders between the surface portions. The ridges 371 and valleys 372 can also be formed as essentially rectilinear, which then have essentially rectilinear borders between the surface portions.

Figure 3E:
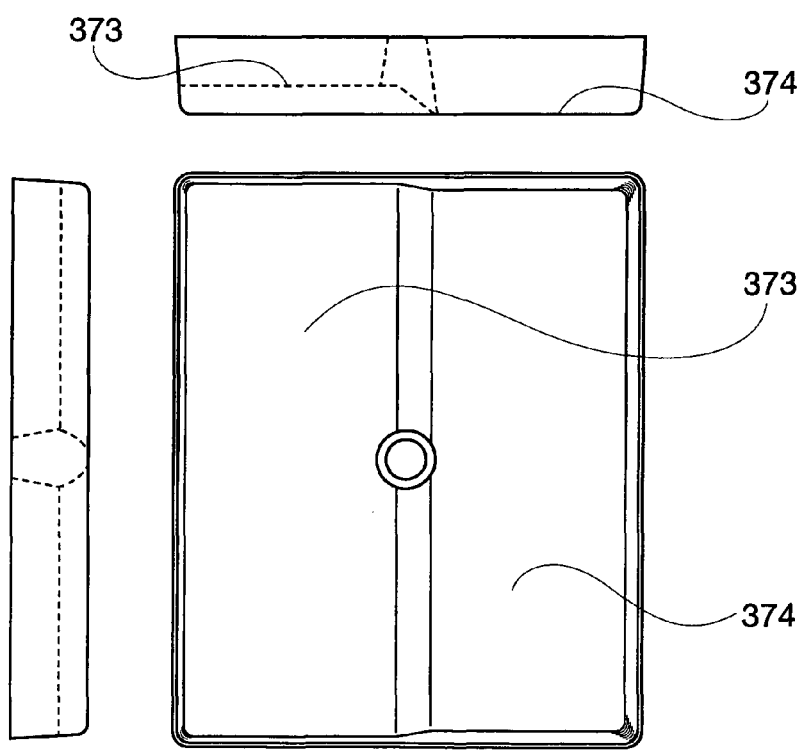

According to the embodiment illustrated in FIG. 3e, the surface portions of the UV-absorbing layer is made up of a plateau 373 and a valley 374 arranged alongside of each other in the lengthwise direction of the container, where the plateau 373 and the valley 374 each form essentially half of the surface. The sizes of the plateau 373 and the valley 374 can here be varied by a skilled person such that the required temperature difference, and thereby also circulation, is achieved for the volume portions of water above the plateau 373 and the valley 374. The relatively large areas for the plateau 373 and the valley 374 here make the killing more efficient.

The different embodiments being illustrated in FIGS. 3a-e all have their own particular properties, that influence the heating and circulation of the water. Thus, the different embodiments each have an advantageous form of the UV-absorbing layer, which are suitable for different situations of purification of water.

The permeable layers in the FIGS. 3a-3e, and also in FIGS. 2a-b have, as was stated above, an essentially flat shape and includes a relatively this layer having a high transparency for UV-radiation. The permeable layer is realisable by a relatively thin layer, since the permeable layer in the container according to the invention is not going to be exposed to any major stresses, for example during transport of the container. The essentially flat and thin UV-permeable layer has the effect that air pockets are not formed at the permeable layer when the container is filled with water and that only the relatively thin layer has to be passed by the UV-rays on their way into the container. Thereby, a minimum of UV-radiation is reflected away, whereby a large part of the UV-radiation reaches the absorbing layer, and the killing is made more efficient.

According to an embodiment, the plateau 223, 373 in the embodiments shown in FIGS. 2a-b and 3b and 3e is given an area, which is larger than the area for the valley 222, 374. This results in advantageous temperature differences, and thereby streams, for the water in the first and second portion, respectively, of the container, that is for the water between the UV-permeable layer and the plateau 223, 373 and valley 222, 374, respectively.

According to an embodiment of the invention, the plateau 223, 373 has, in the embodiments illustrated in FIGS. 2a-b and 3e non-rectilinear edges, that is the plateau is an elevation from the valley 222, 374, which has essentially any shape of its outer edge. Thus, the plateau can, according to this embodiment, be made up of an essentially round or oval elevation. Also, according to the embodiment, the junction between the plateau 223, 373 and the valley 222 is rounded, in order for organic material to be easier to remove. The plateau may thus have the shape of a large and relatively extended hill.

In the FIGS. 2a-b and 3a-e, the invention is, for the sake of simplicity, illustrated in the form of UV-absorbing layers having essentially two surface portions of different distances to the UV-transparent layer. However, according to the present invention, also more than two such surface portions having different distances to the UV-transparent layer may be arranged. The invention is thus not limited to the two levels of the UV-absorbing layer being illustrated in these figures.

According to an embodiment of the present invention, temperature differences, and thereby also circulation, can be achieved by influencing the absorption ability for one or more parts of the UV-absorbing layer. This is, according to this embodiment, done by, for certain parts of the layer, changing the UV-absorbing layer itself, by applying a different colour to the layer. The UV-absorbing layer is generally dark coloured, preferably black, and also has a matt surface. According to this embodiment, certain parts of the UV-absorbing layer are arranged by a lighter colour, preferably an essentially white colour. This has the effect that the UV-absorbing layer absorbs less UV-radiation for these parts, and that the water in connection with these parts is heated less than water in connection with parts having the normally used black colour. Thus, by this embodiment of the invention, temperature differences between water volumes in connection with different parts of the UV-absorbing layer are obtained. These temperature differences result in streams in the water volume, which give a quicker heating of the water and a more efficient killing of microorganisms.

According to an embodiment of the present invention, the parts of the UV-absorbing layer having a lighter colour are arranged on the surface portion of the UV-absorbing layer having the longest distance to the for the sunlight permeable layer. This increases the temperature differences between the different surface portions of the UV-absorbing layer even more, which increases the circulation of the water.

According to an embodiment of the invention, a shading of one or more parts of the UV-absorbing surface is arranged. This shading is achieved preferably by providing one or more portions of the UV-transparent layer with a material, which does not let UV-radiation pass through it. In this way, parts of the UV-absorbing layer are created, which are shaded and where the UV-absorbing layer absorbs less UV-radiation, which has the effect that the water in connection with these parts is heated less than water in connection with non-shaded parts. By this embodiment of the invention, temperature differences between water volumes in connection with different parts of the UV-absorbing layer are obtained. These temperature differences result in streams in the water volume, which result in a quicker heating of the water and a more efficient killing of microorganisms.

According to an embodiment of the present invention, the shaded parts are arranged on the surface portion of the UV-absorbing layer having the longest distance to the sunlight permeable layer. This increases the temperature differences between the different surface portions of the UV-absorbing layer even more, which increases the circulation of the water.

As is obvious for a skilled person, the different embodiments for creating the different levels of the UV-absorbing layer may be adjusted in a number of ways in order to adjust the water purification to current circumstances. Further, it is obvious for a skilled person that the differently coloured parts and the shaded parts of the UV-absorbing layer may be arranged in a number of ways. The present invention includes all such ways.

The invention claimed is:

1. Container (100) for purification of water by utilizing sunlight, including a first section (110, 210), which at least partly includes a sunlight permeable layer (111, 211), and a second section (120, 220), which at least partly is opposite the first section and at least partly includes a sunlight absorbing and infrared radiation emitting (IR-emitting) layer (121, 221), wherein the first and the second section together enclose a volume (130, 230), in which the water can be received to be heated by and exposed to sunlight, characterized in that the first section (110, 210), is formed such that the permeable layer is essentially flat, and the second section is arranged such that the volume includes at least a first and a second portion, wherein the first and the second portion, respectively, have a first and a second distance, respectively, between the permeable layer (111, 211) and the sunlight absorbing and IR-emitting layer (121, 221), where the first and second distances are mutually different, wherein a temperature difference between the water in the first and second portion is created after a period of sun exposure.

2. Container (100) as claimed in claim 1, characterized in that the second section includes a surface being arranged such that the sunlight absorbing and IR-emitting layer (121, 221) on the surface includes at least two surface portions (222, 223, 373, 374), wherein the at least two surface portions (222, 223, 373, 374) are on mutually different height levels in relation to a propagation plane for the surface, and thereby determine the first and second distances.

3. Container (100) as claimed in claim 2, characterized in that the at least two surface portions (222, 223, 373, 374) of the sunlight absorbing and IR-emitting layer (121, 221) are made up of any of the shapes in the group of: an essentially centered plateau surrounded by a valley; a plateau and a valley arranged alongside each other in the cross-direction of the container; a plateau and a valley arranged alongside each other in the lengthwise direction of the container.

4. Container (100) as claimed in claim 2, characterized in that the at least two surface portions (222, 223, 373, 374) of the sunlight absorbing and IR-emitting layer (121, 221) are made up of any of the shapes in the group of: at least one ridge and a valley, arranged in the lengthwise direction of the container; at least one essentially spherically shaped hill surrounded by a valley.

5. Container (100) as claimed claim 2, characterized in that the at least two surface portions (222, 223, 373, 374) of the sunlight absorbing and IR-emitting layer (121, 221) are arranged as having essentially rectilinear borders between the two surface portions.

6. Container (100) as claimed in 2, characterized in that the at least two surface portions (222, 223, 373, 374) of the sunlight absorbing and IR-emitting layer (121, 221) are arranged as having essentially wave formed borders between the at least two surface portions (222, 223, 373, 374).

7. Container (100) as claimed in claim 1, characterized in that the second section (120, 220) includes one bottom and four walls, wherein the surface is made up of the bottom.

8. Container (100) as claimed in claim 1, characterized in that the sunlight absorbing and IR-emitting layer (121, 221) is arranged such that the sunlight absorbing ability is decreased for at least one part of the sunlight absorbing and IR-emitting layer (121, 221).

9. Container (100) as claimed in claim 8, characterized in that the sunlight absorbing ability is decreased by applying an essentially white color to the at least one part.

10. Container (100) as claimed in claim 8, characterized in that the at least one part is situated in a surface portion (222, 374) of the sunlight absorbing and IR-emitting layer (121, 221), which is adjacent to the portion of the volume having a longer distance between the permeable layer (111, 211) and the sunlight absorbing and IR-emitting layer (121, 221).

11. Container (100) as claimed claim 1, characterized in that a shading of at least one part of the sunlight absorbing and IR-emitting layer (121, 221) is arranged by providing the permeable layer (111, 211) with at least one portion of a sunlight non-permeable material.

12. Container (100) as claimed in claim 11, characterized in that the at least one shaded part is situated on a surface portion of the sunlight absorbing and IR-emitting layer (121, 221), which is adjacent to the portion of the volume having a longer distance between the permeable layer (111, 211) and the sunlight absorbing and IR-emitting layer (121, 221).

* * * * *